(12) United States Patent
Mandle

(10) Patent No.: US 7,388,472 B2
(45) Date of Patent: Jun. 17, 2008

(54) VEHICLE ANTI-THEFT TIME BASED ENGINE START INHIBITOR

(75) Inventor: Richard John Mandle, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 229 days.

(21) Appl. No.: 11/287,091

(22) Filed: Nov. 23, 2005

(65) Prior Publication Data

US 2007/0115100 A1    May 24, 2007

(51) Int. Cl.
*B60R 25/10* (2006.01)
(52) U.S. Cl. .............. 340/426.1; 340/426.11; 340/430; 307/10.2; 307/10.3
(58) Field of Classification Search ......... 340/426.11, 340/426.1
See application file for complete search history.

(56) References Cited

U.S. PATENT DOCUMENTS

| 4,624,578 A | 11/1986 | Green ................... 368/10 |
| 5,477,827 A | 12/1995 | Weisman, II et al. ....... 123/436 |
| 5,483,927 A | 1/1996 | Letang et al. ............ 123/41.12 |
| 5,510,780 A | 4/1996 | Norris et al. ........... 340/825.56 |
| 5,647,317 A | 7/1997 | Weisman, II et al. ....... 123/299 |
| 5,714,946 A | 2/1998 | Gottshall et al. ....... 340/870.16 |
| 5,732,676 A | 3/1998 | Weisman et al. ........... 123/436 |
| 6,356,186 B1 | 3/2002 | Price et al. .............. 340/426 |
| 6,380,848 B1 | 4/2002 | Weigl et al. .............. 340/426 |
| 6,570,267 B1 | 5/2003 | Moriya et al. ............ 307/10.2 |
| 6,917,853 B2 | 7/2005 | Chirnomas ................ 700/244 |

*Primary Examiner*—Donnie L. Crosland
(74) *Attorney, Agent, or Firm*—Bill C. Panagos; Rader, Fishman & Grauer, PLLC.

(57) ABSTRACT

A vehicle anti-theft method for use in a vehicle having an internal combustion engine, an ignition, a starter, fuel injectors, a memory, an engine controller, and a real clock time function in the engine controller, said engine controller being configured to operate the engine in a plurality of different modes including a theft protection mode, comprises; a) comparing a lock window definition time with an engine controller real clock time; b) operating the engine in a theft protection mode when the real clock time matches the lock window definition time; c) determining whether the engine is running, and; d) controlling the operation of the engine.

13 Claims, 2 Drawing Sheets

VEHICLE ANTI-THEFT TIME BASED ENGINE START INHIBITOR

BACKGROUND OF THE INVENTION

1. Field of Invention

The present invention relates to a vehicle anti-theft system and method to provide such functionality.

2. Description of the Related Art

Price et al. U.S. Pat. No. 6,356,186 is assigned to Detroit Diesel Corporation. The patent discloses a vehicle anti-theft system and method that operates the engine in a theft mode protection in which the engine is permitted to operate at idle or speed limited is provided the method includes a armed password, comparing the password with a stored password in the memory, and operating the engine in the theft mode protection when the armed password matches the stored password.

The present invention differs from Price et al. '186. Specifically, the present invention does not require the use of a stored password and does not require the operator to know an armed password. Moreover, Price et al. '186 requires a handheld device or some other device when an operator enters the armed password into the system for comparison to the stored password. Such a required interface is lacking in the present invention.

Norris et al. U.S. Pat. No. 5,510,780 discloses a self-contained timed cycled security code activation system for controlling power equipment including a truck. The system includes a keyboard by which an activation security code is entered into a microprocessor. The microprocessor controls an activation relay, which selectively controls the equipment and has stored therein a plurality of security codes, which are timed cycled by a real time clock. This differs from the present invention. Specifically, the present invention does not require the use of multiply security codes and does not envision the use of an interface such as a keyboard or other coded device in order to activate the vehicle.

SUMMARY OF THE INVENTION

The present invention relates to a vehicle anti-theft method for use in a vehicle having an internal combustion engine, an ignition, a starter, an fuel injectors, a memory, engine controller and a real clock time function engine controller. The engine controllers configure to operate the engine in a plurality of different modes including a theft protection mode. The theft protection mode comprises; a) comparing a lock window definition time with an engine controller real clock time; b) operating the engine in a theft protection mode when the real clock time matches the lock window definition time; c) determining whether the engine is running, and; d) controlling the operation of the engine.

The invention further comprises a system for use in a vehicle having an internal combustion engine, an ignition, a starter, fuel injector, a memory, engine controller, and a real clock time function in the engine controller. The system comprises; a) lock window time storing memory and; b) control logic operative to compare the lock window time in memory to the real clock time. Control logic is further provided that is operative to determine a desired theft mode protection from a plurality of theft protection modes, the plurality of theft protection modes including at least one mode to permit continued engine operation of the vehicle in vehicle theft mode when the engine operation is initiated prior to the lock window time and extends into the lock window time until the ignition is turned off at which time the vehicle will not be able to started until the lock window time has elapsed.

These and other objects features and advantages of the present invention may be readily apparent to those of ordinary skill in the art by reading the following the detailed description of preferred embodiments without and various modifications made be made without departing from the scope and spirit of the invention as described herein.

DETAILED DESCRIPTION OF THE PREFERRED EMBODIMENT(S)

Figure 1:
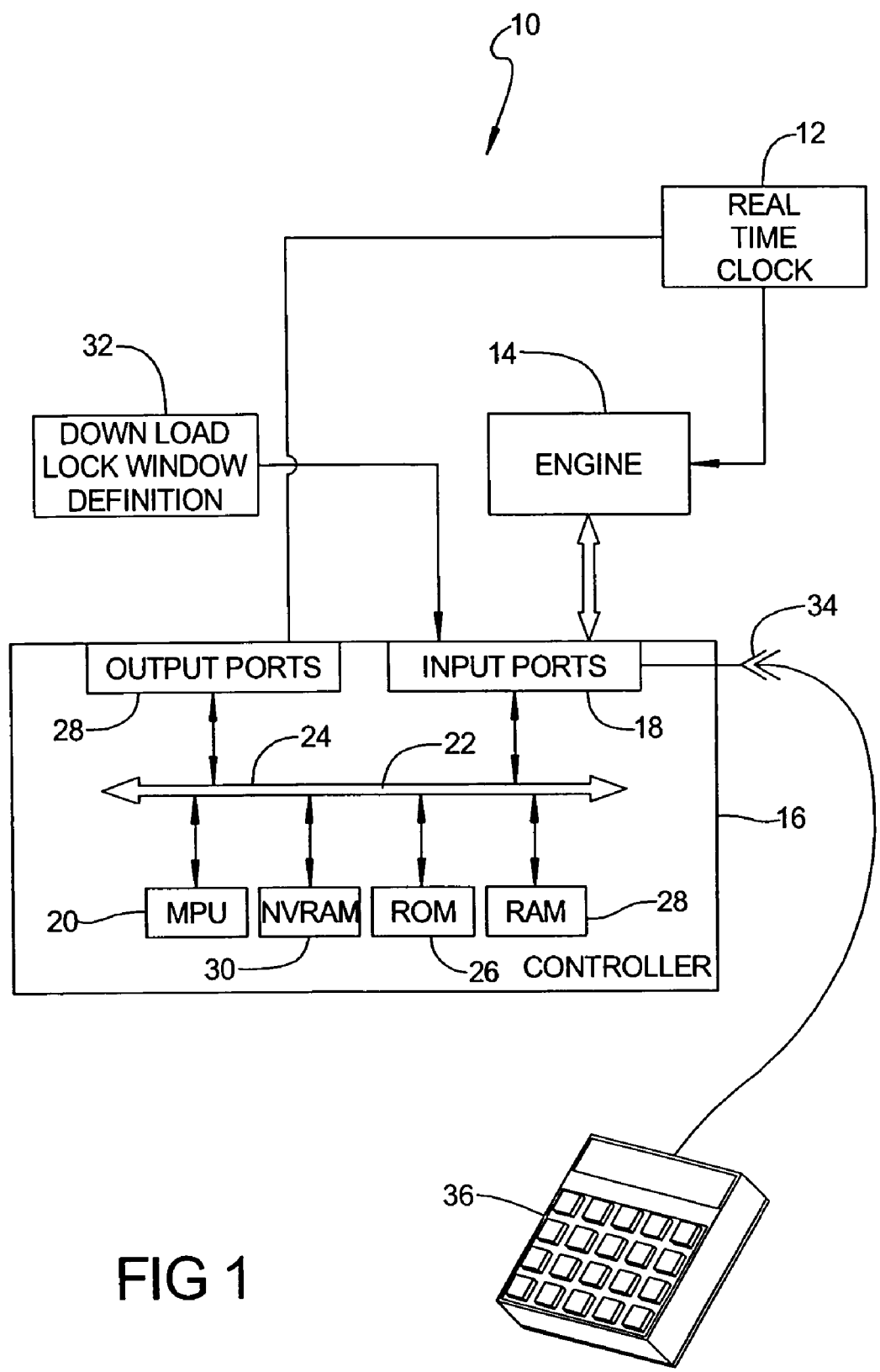
FIG. 1 is a schematic view of an engine with real clock time in accordance with the present invention.

Referring now to the drawings when like numerals refer to like structures, and in particularly to FIG. 1, the vehicle anti-theft system 10 includes engine 12 having a plurality of cylinders fueled by fuel injection by fuel injectors or common rail. In the preferred embodiment, the engine 12 is a compression ignition and internal combustion engine such as a four, six, eight, twelve, sixteen or twenty-four cylinder diesel engine or a diesel engine having any other desired number of cylinders. The fuel injectors are receiving pressurized fuel from a supply connected to one or more high or low-pressure pumps (not shown) as is well known to those who are skilled in the art. Alternatively, embodiments of the present invention may employ a plurality of unit pumps (not shown) with each pump supplying fuel to one of the injectors. The system may also include an ignition and, a starter, such as is well known to those of ordinary skill in the art. A controller 16 preferably includes a microprocessor 20 in communication with various computer readable storage media 32 via data and control bus 24. Computer readable storage data may include any of a number of known devices which function as a read only memory (ROM), radium access memory (RAM), non volatile random access memory (NVRAM) and the like. The computer readable storage media may be implemented by any of a number of known physical devices capable of storing data representing instructions executable via a computer such as a controller. Known devices may include, but are not limited to PROM, EPROM, EEPROM, flash memory, and the like in addition to magnetic, optical, and combination media capable of temporary permanent data storage.

The computer readable storage media includes various programs, instructions, software and control logic to effect control of various systems and sub-systems of the vehicle, such as the engine 12, the vehicle transmission, the ignition, the starter and the like. The controller receives signals from sensors via input ports and generates output signals which may be provided to various actuators and all components via the output ports. At data, diagnostics and programming interface 13 may also be selectively connected to the controller by a plug to exchange various information. The interface may be used to change values within the computer readable storage such as configurations settings, control logic, and the desired theft mode protection calibration value when present. In accordance with the present invention, the system is connected electronically to a set of calibrations and a time lock window setting is downloaded with other calibrations necessary to operate the engine through an interface to the controller to activate and deactivate a vehicle theft protection mode of engine operation. Examples of lock window settings are time of day, day of week, holiday, calendar day or any combination thereof. Of course in accordance with the present invention, there may be more than one theft protection mode and preferably there are several theft protection modes that the vehicle operator may choose from including a most out mode, an immediate deactivate engine mode, or permit the engine to continue to operate when engine operation initiates before lock time window. The lock time window may be changed using any hand held device such as known in the art, so long as it is compatible with the ECM software.

In a preferred embodiment, the controller monitors sensors and the display device interface and executes control logic in hardware and or software. Preferably, the controller is a DDEC controller available from Detroit Diesel Corporation of Detroit, Mich. Various other features of this controller are described in detail U.S. Pat. Nos. 5,477,827 and 5,445,128, it is the disclosure of which are hereby incorporated by reference. However, it is contemplated that this invention may be adapted for use with any engine controller.

It should be appreciated by those of ordinary skill in the art, the control logic may be implemented or effected in hardware, software, or a combination of hardware and software. The various functions are preferably affected by a programmed microprocessor, such as the DDEC controller that may include one or more functions implemented by dedicated electric, electronic or integrated circuits. As will also be appreciated, the control logic may be implemented using any number of many programming and processing techniques and strategies and is not limited to the order or sequence illustrated here which is merely for convenience. Parallel processing and multi-tasking systems and the methods may be used to accomplish the objects, features and advantages of the present invention. The present invention is independent of the particular programming language, operating system, or processor used to implement the control logic illustrated.

Figure 2:
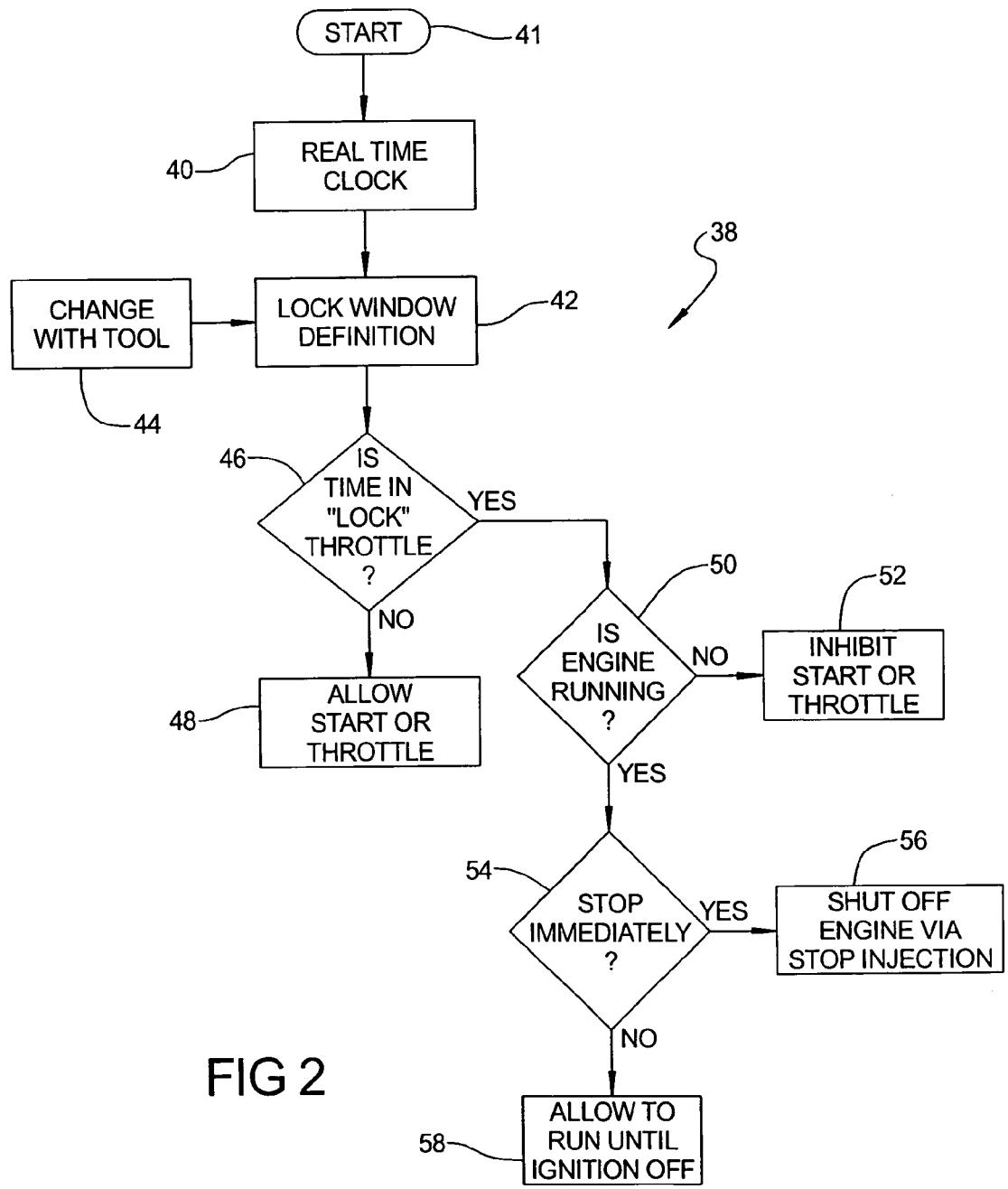
FIG. 2 is a block diagram illustrating a method of the present invention.

Turning now to FIG. 2, there is shown a float chart describing a method of the present invention for a vehicle anti-theft protection. It is to be expressly understood that those of ordinary skill in the art will appreciate that the flow chart is arranged to facilitate an understanding of the method of the present invention and the order of the steps illustrated in FIG. 2 is not meant to be limiting in any way. Thus, it may be understood that the steps disclosed in FIG. 2 may be performed in a variety of orders and other equivalent control logic may be substituted therefore and used in addition to as illustrated in the float chart 38. At start block 41 the real time clock 30 is compared with the lock window definition 32. If the lock window definition time matches the real clock time as set forth in 46 a determination is made whether to allow the vehicle to start if the lock window definition does not match the real clock time, then the vehicle is allowed to start or throttle is enabled thereby facilitating operation of the engine. However, in the event the lock time matches the real clock time a determination at block 50 is made whether the engine is running. If the engine is not running then, as set forth in block 52, the starting of the engine is inhibited by interfering with the starter, preventing ignition from occurring, or controlling throttle in delivery of fuel. If it is determined that the engine is running then at block 54 a decision is made whether to stop the engine immediately. If it is decided to stop the engine immediately the engine is shut off via control of fuel injection. In other words, the delivery of fuel is stopped and the engine ceases to operate.

If it is determined that it is not necessary to stop the engine immediately, such as when the vehicle is in operation prior to the lock time window and operation is necessary to be continued through the period, then the delivery of fuel is permitted until such time as the ignition is turned off at which time it cannot be restarted as either the starter is disabled, throttle is disabled, or ignition is disabled.

The determination of whether to immediately stop the engine as set forth is block 54 can be a calibration parameter set at the factory or changeable by the vehicle owner operator or fleet owner. This change would be effected by use of a hand held tool such as is known in the art.

While the embodiments this invention have been illustrated and described, it is not intended that these embodiments are limited in any way and that various modifications will occur to those of ordinary skill in the art without departing from the scope and spirit of the invention as set forth in the appended claims.

I claim:

1. A vehicle anti-theft method for use in a vehicle having an internal combustion engine, an ignition, a starter, fuel injectors, a memory, engine controller, and a real clock time function in the engine controller, said engine controller being configured to operate the engine in a plurality of different modes including a theft protection mode, the method comprising;
    (a) comparing a lock window definition time with an engine controller real clock time;
    (b) operating the engine in theft protection mode when the real clock time matches the lock window definition time;
    (c) determining whether the engine is running, and
    (d) controlling the operation of the engine.

2. The method of claim 1, including controlling fuel delivery to control the operation of the engine.

3. The method of claim 1, including controlling the starter to control the operation of the engine.

4. The method of claim 1, including entering the lock window definition time manually.

5. The method of claim 1, further comprising determining whether to stop the engine immediately.

6. The method of claim 1, further comprising determining whether to permit the engine to continue operation until engine ignition is shut off.

7. A vehicle anti-theft method for use in a vehicle having an internal combustion engine, an ignition, a starter, fuel injectors, a memory, engine controller, and a real clock time function in the engine controller, said engine controller being configured to operate the engine in a plurality of different modes including a theft protection mode, the method comprising;
    (a) receiving a lock window time;
    (b) comparing the lock window time with the real clock time;
    (c) determining a desired theft protection mode from the plurality of theft protection modes, the plurality of theft protection modes including at least one mode that permits continued engine operation in the vehicle theft protection mode when said engine operation initiates prior to the lock window time and extends into said lock window time.

8. The method of claim 7, including disabling the starter when the ignition is off.

9. The method of claim 8, including controlling the fuel delivery to control the engine operation.

10. A vehicle antitheft system for use in a vehicle having an internal combustion engine, an ignition, a starter, fuel injectors, a memory, engine controller, and a real clock time function in the engine controller, said system comprising;
(a) a lock window time in memory, and
(b) control logic operative to compare the lock window time in memory to the real clock time; said control logic being further operative to determine a desired theft protection mode from a plurality of theft protection modes, the plurality of theft protection modes including at least one mode to permit continued engine operation in the vehicle theft mode when said engine operation is initiated prior to the lock window time and extends into said lock window time until the ignition is off at which time the vehicle will not be able to be started until the lock widow time has elapsed.

11. The system of claim 10, further including an input device to manually enter a lock window time.

12. The system of claim 11, further including a vehicle theft mode to cease delivery of fuel during lock window time when the engine is not in operation during the window lock time.

13. The system of claim 11, further including a vehicle theft mode to disable the starter during the lock window time when the engine is not in operation during the lock window time.

* * * * *